United States Patent [19]

Conner et al.

[11] Patent Number: 4,643,466
[45] Date of Patent: Feb. 17, 1987

[54] PIPE JOINT ASSEMBLY WITH SNAP RING AND ASSOCIATED METHOD

[75] Inventors: Randall C. Conner, Birmingham; Van T. Walworth, Warrior, both of Ala.

[73] Assignee: American Cast Iron Pipe Company, Birmingham, Ala.

[21] Appl. No.: 594,908

[22] Filed: Mar. 29, 1984

[51] Int. Cl.⁴ ............................................. F16L 39/00
[52] U.S. Cl. ...................................... 285/321; 285/374
[58] Field of Search ............... 285/321, 374, 309, 310, 285/403

[56] References Cited

U.S. PATENT DOCUMENTS

| | | |
|---|---|---|
| 1,873,621 | 8/1932 | Moore . |
| 2,009,650 | 7/1935 | Claussen et al. . |
| 2,097,628 | 11/1937 | Liebhardt ........................ 285/374 X |
| 2,441,344 | 5/1948 | Bosworth ........................... 285/321 |
| 2,774,617 | 12/1956 | Lanninger . |
| 2,806,717 | 9/1957 | Hempel . |
| 2,877,732 | 3/1959 | Eaton ............................... 285/321 X |
| 2,883,083 | 4/1959 | Terry, Jr. et al. ............... 285/309 X |
| 2,991,092 | 7/1961 | MacKay .......................... 285/374 X |
| 3,167,331 | 1/1965 | Marshall ......................... 285/321 X |
| 3,177,019 | 4/1965 | Osweiler ........................ 285/321 X |
| 3,219,364 | 11/1965 | Wooldridge . |
| 3,381,983 | 5/1968 | Hanes ............................... 285/321 |
| 3,521,911 | 7/1970 | Hanes et al. ................... 285/321 X |
| 3,540,760 | 11/1970 | Miller ............................... 285/321 |
| 3,600,010 | 8/1971 | Downs ............................ 285/321 X |
| 3,684,320 | 8/1972 | Platzer et al. ................. 285/374 X |
| 3,698,744 | 10/1972 | Bevington . |
| 3,724,880 | 4/1973 | Seiler ............................. 285/321 X |
| 3,776,576 | 12/1973 | Keyser ............................ 285/321 X |
| 3,813,065 | 5/1974 | Hallesy et al. ................. 285/321 X |
| 3,884,510 | 5/1975 | Bram ............................... 285/374 X |
| 3,941,410 | 3/1976 | Miyaoka ......................... 285/321 |
| 4,097,074 | 6/1978 | Nagao et al. ................... 285/321 X |
| 4,127,290 | 11/1978 | Mutschlechner ............... 285/374 X |
| 4,296,953 | 10/1981 | Nagao et al. ................... 285/374 X |
| 4,428,604 | 1/1984 | Conner ............................. 285/321 |
| 4,456,288 | 6/1984 | Conner ............................. 285/321 |

FOREIGN PATENT DOCUMENTS

| | | |
|---|---|---|
| 948463 | 8/1956 | Fed. Rep. of Germany ...... 285/374 |
| 2162435 | 6/1973 | Fed. Rep. of Germany ...... 285/374 |
| 2205000 | 8/1973 | Fed. Rep. of Germany ...... 285/321 |
| 106917 | 8/1979 | Japan ............................... 285/374 |
| 106916 | 8/1979 | Japan ............................... 285/374 |
| 106918 | 8/1979 | Japan ............................... 285/374 |
| 632049 | 11/1949 | United Kingdom ............... 285/321 |
| 1077599 | 8/1967 | United Kingdom ............... 285/321 |

Primary Examiner—Richard J. Scanlan, Jr.
Attorney, Agent, or Firm—Kerkam, Stowell, Kondracki & Clarke

[57] ABSTRACT

A pipe joint is restrained against axial separation by the use of a bearing ring. Various embodiments of bearing rings having wedging surfaces cause an increase in the resistance to pipe separation as the joint separating thrust increases. That is, as the force tending to cause pipe separation increases, the wedging surface on the bearing ring cooperates with a corresponding wedging surface on a spigot ring to increase the resistance of the pipe joint to separation. The spigot rings are connected to the spigots by welding, set screws, heat-shrinking, etc.

A specially shaped snap ring or bearing ring and associated method of making the bearing ring is used to avoid possible problems resulting from manufacturing tolerances. Specifically, the bearing ring is constructed with a major diameter greater than diameters at other locations on the ring.

16 Claims, 14 Drawing Figures

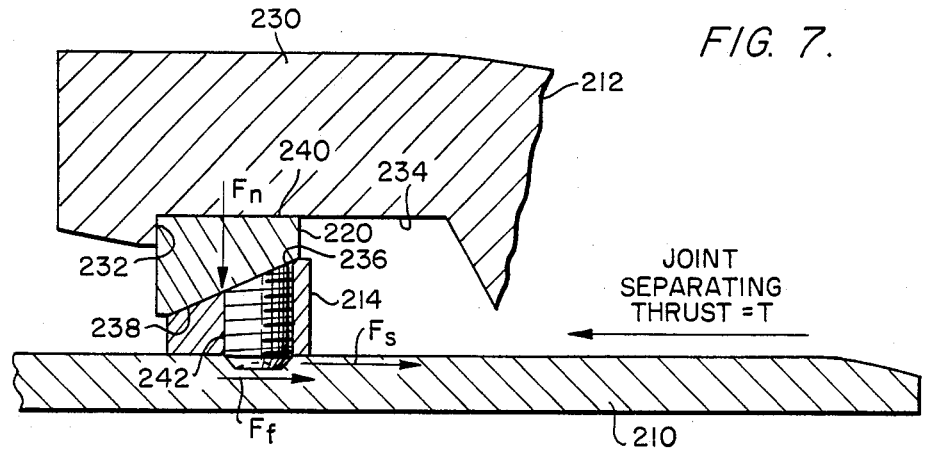
FIG. 7.
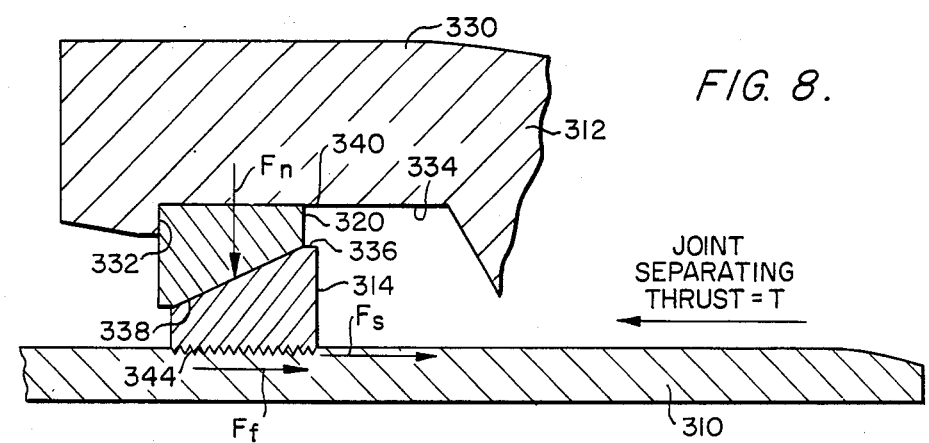
FIG. 8.
FIG. 9.
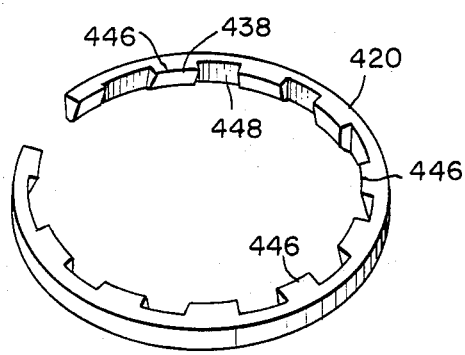

PIPE JOINT ASSEMBLY WITH SNAP RING AND ASSOCIATED METHOD

BACKGROUND OF THE INVENTION

The present invention relates to restrained pipe joints and, more specifically, to a pipe joint including a snap ring which prevents axial movement of the bell end of one pipe relative to the spigot end of an attached pipe.

The use of pipe joints, couplings and fittings of the socket and spigot type is well known and is shown, in U.S. Pat. No. 2,991,092, issued to Jack W. MacKay on July 4, 1961. The MacKay patent, which is assigned to the assignee of the present invention and hereby incorporated by reference, discloses the use of a double sealing gasket for socket and spigot type joints. The simplicity and tightness of the seal in the joint disclosed in the MacKay patent makes this joint useful for a wide variety of applications.

Such joints are continually subject in use to axial forces which tend to move one pipe away from the adjacent and connecting pipe. Numerous attempts have been made to construct pipe joints designed to withstand axial forces. Such pipe joints are often complex in construction and may require extensive modification of the basic socket and spigot ends of the connecting pipes. Often these pipe joints require some form of bolt arrangement designed to clamp one pipe to the adjacent pipe. Such bolt type of pipe joints are generally ill suited for allowing angular deflection between the spigot end of one pipe and the attached socket or bell end of another pipe. It should be noted that it is generally desirable for a pipe joint to accommodate limited angular deflection or pivoting movement between the spigot end of the pipe and the attached socket end of the pipe making up a particular pipe joint.

Another form of restrained pipe joint provides the spigot end of the pipe with a locking collar welded or otherwise attached to it. In such an arrangement, the bell member of the socket pipe is inserted between the locking collar and the spigot end of the pipe itself, whereupon the locking collar is rotated to an angular position relative to the bell member and locked therein such that the bell member may not be axially displaced relative to the locking collar and spigot. Although it is generally advantageous to lessen stresses by allowing some rotation between socket and spigot, this rotation feature may be disadvantageous in certain respects. For example, the tolerance of the socket or bell member must be tightly controlled. If the bell member is too large it may prevent rotation and locking or it may bind on the locking collar of the spigot section making rotation of the locking collar extremely difficult. Alternatively, if the bell member is too small, it will not prevent back rotation of the locking collar, raising the possibility that the repeated application of fluid through the pipe may cause the locked joint to be undone. Thus, this structure must contain some means to prevent unintentional rotation of the locking collar. This structure is usually complex and is less than desirable in strength and cost.

Another form of known restrained pipe joint employs a snap-ring to secure the spigot and socket against separation. Snap-rings have generally required substantial modification to the basic spigot and socket interface, and usually need a slot or window in the socket pipe for allowing adjustment to the snap-ring diameter to lock or unlock the joint. This slot or window is a point of weakening stress concentration and presents a problem in construction. Accessability to the snap-ring also becomes a serious problem. In addition, if the gasket is carried by the spigot member and the snap-ring is carried by the bell member, as is the case in the prior art, the gasket must pass by the snap-ring member during installation. The gasket is thus vulnerable to damage in installation.

An invention which avoids or minimizes most of these problems is described in detail in U.S. patent application Ser. No. 242,925, now U.S. Pat. No. 4,428,604, issued Jan. 31, 1984 in the name of Randall C. Conner and titled "Restrained Pipe Joint and Associated Snap-Ring". This patent, assigned to the assignee of the present invention and hereby incorporated by reference, discloses a pipe joint having a snap ring having continuous annular external and internal contours (i.e., no slots or windows). A continuation-in-part (CIP) application, Ser. No. 390,881 to this patent was filed June 21, 1982. The CIP application issued June 26, 1984 as U.S. Pat. No. 4,456,288. Both the '604 patent and its CIP disclose ring adjustors used to press a snap ring inward against a spigot end of a pipe or alternately press the snap ring outward against a socket end of a pipe. The CIP application discloses a design which allows easier rotation between attached pipes than the basic design in U.S. Pat. No. 4,428,604. A divisional application of Ser. No. 242,925, was filed on Nov. 1, 1983 and assigned Ser. No. 547,680 and issued as U.S. Pat. No. 4,524,505 on June 25, 1985. The CIP and divisional applications are assigned to the assignee of the present invention and are hereby incorporated by reference.

As mentioned above, it is sometimes advantageous to provide restrained pipe joints that are capable of significant amounts of angular deflection. Specifically, a pipe joint wherein a pipe can have its axis deflected out of line with the axis of the attached pipe is useful in adjusting the pipe joint for unstable soils and other problems in the layout and installation of the pipes.

The amount of deflection for the pipe joint of the type described in U.S. Pat. No. 4,428,604 is a function of the assembly clearance. However, the assembly clearance is purposely limited by design to minimize the possibility of failure (i.e., joint application) caused by stress concentrations. If the angle of deflection is too great, stress would be concentrated on a relatively small bearing area. A joint separating thrust could then cause joint separation.

Although pipe joints designed with a ball-and-socket arrangement can accommodate great angles of deflection, the cost of such pipe joints is quite high. Such pipe joints have a spherical ball at the end of one pipe to fit within a spherical socket at the end of an attached pipe and are generally not cost effective except for quite severe pipe joint applications.

Pipe joint designs often require one to field-cut pipes in restrained joint locations in order to position fittings and/or valves or other fixtures at their desired positions in the pipeline, in lieu of adequate shop drawings or layouts of prefabricated systems. This presents a significant design problem when the thrust resisting capabilities of a restrained joint are heavily dependent on the quality of the fabrication work preformed to produce it. In the case of restrained joints for ductile iron pipes, this required shop fabrication procedure often requires welding of a raised member(s) on the spigot and/or bell. The welding of ductile iron pipes requires equipment and skills sometimes not easily obtainable in the field by those who install the pipes. Consequently, it is desirable in many cases to offer alternate means of assembling restraining members onto the pipes in the field which may be accomplished without the use of elaborate equipment and skilled labor.

One such restraining means that may be used to produce field-adaptable restrained joints is the mechanical joint retainer gland, employing set-screws to lock and hold a gland to the spigot of a pipe. Such structures use multiple radial set-screws set through tapped holes in the lip of the gland, and the cupped points on the set-screws are used to set into the surface of the spigot pipe to prevent endwise separation of the pipes. With such a restraining mechanism, it is possible to field cut a pipe for length adjustment, assemble the rubber-gasketed joint, and then tighten the set-screws to produce a reliable field-cut restrained joint. This may be accomplished with relatively unskilled labor.

However, such retainer gland pipe joints are very limited in thrust capabilities and pipe size. The thrust resisting capabilities of the retainer gland joint are directly dependent on the holding power of the set-screws. This holding power is determined primarily by the initial torque of (and indentation of the spigot pipe by) the set-screws. When subjected to joint separating force, the set-screws subject the indented pipe metal to shearing forces in the direction of thrust. Thus, the thrust resisting capabilities of the joint are primarily a function of this shearing resistance plus frictional resistance, which is a function of normal (or radial) force between the pipe metal and screw. Due to the greater thrusts caused by unbalanced internal pressure or other forces and the increasing flexibility of the pipe walls, ordinary mechanical joint set-screw glands become less desirable with increasing pipe size. It is not practical to increase the size, torque, or number of set-screws enough to achieve adequate thrust resisting capabilities in larger pipe. An increase in size or torque on the set-screws results in increased localized deflection or failure in the spigot pipe wall with the possibilities of leakage by the gasket due to lack of adequate gasket compression in service and/or structural failure of the pipe wall. Thus, an increase in number and/or size of set-screws results in increased cost, more difficulty in installation, and increases in stress in the gland and spigot.

Another problem with numerous prior art pipe joints is that minor variations in size due to manufacturing tolerances pose a design trade-off between making a joint especially secure but difficult to assemble or making the joint easy to assemble but less secure than otherwise desirable.

Prior art pipe joints have generally been disadvantageous in that they may appear to be secured or locked while the joint is actually improperly installed causing leaks and even total failure of the pipe joint.

Accordingly, whereas numerous techniques have been developed for axially restraining pipe joints from separation due to axial forces, the techniques are subject to several disadvantages and it is therefore a principal object of the present invention to provide an improved pipe joint locked against separation, while allowing for significant angular displacement between adjacent pipes without concentrating great stress on a limited bearing area.

A still further object of the present invention is to provide an improved pipe joint wherein rotation of the socket or bell end pipe relative to the spigot end pipe will not cause unlocking of the joint.

Yet another object of the present invention is to provide an improved axially restrained pipe joint wherein assembly may be accomplished conveniently and without a need for skilled labor.

A further object of the present invention is to provide a method and pipe joint adapted for easily determining if the pipe joint is properly locked.

Another object of the present invention is to provide a pipe joint of improved deflection performance and retention strength in the deflected position.

A still further object of the present invention is to provide a pipe joint which facilitates dependable field adaptability.

Still another object of the present invention is to provide for a restrained pipe joint including a socket member with only continuous internal or external annular contours. This pipe joint may include a socket member with no holes, slots, windows, or other discontinuities. In addition, no internal or external locking lugs may be required in the locking collar or socket member.

Yet another object of the present invention is to provide a snap ring and associated method of making a snap ring which minimizes the impact of minor variations in manufacturing tolerances.

SUMMARY OF THE INVENTION

The above and other objects of the present invention which will be readily appreciated as the description proceeds are realized by a pipe joint restrained against axial separation comprising: a first pipe having a cylindrical socket; a second pipe having a cylindrical spigot extending into the cylindrical socket and having an axis; a sealing gasket between the cylindrical spigot and the cylindrical socket; a bearing ring retaining portion defining an end plane and having a retaining groove bounded by a lip; a bearing ring having two ends at a split and uniquely defining a plane, the bearing ring being positioned between the retaining portion and one of the first and second pipes and having a first wedging surface tapered radially inward towards the end plane, a lip-engaging surface, and an intermediate surface between the lip-engaging surface and the first wedging surface, the angle between the intermediate surface and the lip-engaging surface being greater than the angle of the first wedging surface relative to the lip-engaging surface, the bearing ring in its unconstrained state having major diameter and a minor diameter less than the major diameter; and an outwardly projecting portion on the one pipe and disposed within the retaining portion and having a second wedging surface tapered radially inward towards the end plane at an angle from 15° to 30° relative to the axis; and wherein the first wedging surface and the second wedging surface together cause the bearing ring to push radially out against the retaining groove when the pipe joint is subject to a joint separating force.

The first wedging surface preferably has an angle from 15° to 30° relative to the axis. In cross-section, each of the first and second wedging surfaces is a straight line. Alternately, in cross-section, the first wedging surface may be a convex curve and, in cross-section, the second wedging surface may be a concave curve. The first wedging surface is continuous and annular in a closed loop and the second wedging surface is continuous and annular to the ends of the bearing ring. Alternately, the second wedging surface may be one of a segmented annular series of wedging surfaces. At least part of the bearing ring is always radially outside of the outwardly projecting portion such that the bearing ring and the outwardly projecting portion together occupy less axial length than the sum of their individual lengths. The retaining portion is part of the socket, the outwardly projecting portion is fixed to the spigot and within the socket, and the bearing ring bears between the retaining portion of the socket and the outwardly projecting portion. The minor diameter is at one of the split ends and the major diameter is 85° to 95° from a mid-point between the split ends. The major diameter is from 1% to 3% greater than the average of diameters at the split ends.

The pipe joint may further comprise a ring adjustor mounted to the bearing ring and disposed outside of the end plane. The intermediate surface has a flat cross-section which is parallel to the axis when the first and second pipes are axially aligned. The socket has only continuous annular contours. The outwardly projecting portion is a ring secured to one pipe by at least one set screw extending radially inward. Alternately, the outwardly projecting portion is a projecting ring heat shrunk onto the one pipe, and the projecting ring includes a serrated surface gripping the one pipe. The outwardly projecting portion may alternately be a ring welded to the one pipe. The socket includes a stop surface tapered radially inward towards the end plane.

The present invention may alternately be described as a method of forming a pipe joint and restraining the joint against axial separation comprising the steps, not necessarily in order, of: placing a bearing ring around a spigot end of a pipe and behind (i.e., relative to the spigot end of the pipe) an outwardly projecting portion of the spigot end of the pipe, the bearing ring having two ends at a split, the bearing ring having a first wedging surface tapered radially inward away from the spigot end, a lip engaging surface, and an intermediate surface between the lip-engaging surface and the first wedging surface, the angle between the intermediate surface and the lip-engaging surface being greater than the angle of the first wedging surface relative to the lip-engaging surface, the bearing ring in its unconstrained state having a major diameter and a minor diameter less than the major diameter, the outwardly projecting portion having a second wedging surface tapered radially inward from the spigot end at an angle from 15° and 30° relative to the axis of the spigot end pipe; disposing the spigot end pipe and outwardly projecting portion within a socket end retaining portion of another pipe, the retaining portion defining an end plane and having a retaining groove bounded by a lip and a sealing gasket; and seating the bearing ring in the retaining groove such that the first wedging surface and the second wedging surface together cause the bearing ring to push radially out against the retaining groove when the spigot end pipe and the socket end pipe are subject to a joint separating force.

The bearing ring is compressed around the spigot end by use of a tool prior to disposing the spigot within the socket, and removal of the tool allows the seating of the bearing ring within the retaining groove. The bearing ring is compressed at least partially radially outside of the outwardly projecting portion such that the bearing ring and the outwardly projecting portion together occupy less axial length than the sum of their individual axial lengths. Alternately, the bearing ring is seated in the retaining groove by caulking the bearing ring past the lip beginning at one place on the bearing ring and progressing around until the entire bearing ring is in the retaining groove.

The method further comprises fabricating a bearing ring by the steps of: cutting a solid ring from a pipe or tube of predetermined diameter, the diameter of the pipe or tube being larger than the outer diameter of the spigot end of a pipe about which the ring is to be placed; cutting out a small section of the ring to leave a gap between two ends at the split; rolling the gapped ring such that the ends move towards each other to reduce the gap and set the ring to have an inner diameter just larger than the outer diameter of the spigot end pipe; and forcing the ends of the ring apart to create a specified permanent set in the ring such that the ring is used as the bearing ring and it is compressable around the spigot end pipe with the inner diameter of the bearing ring intimately around the outer diameter of the socket end pipe.

The present invention further includes a method comprising fabricating a pipe joint bearing ring having a first wedging surface of 60° to 75° relative to a lip-engaging surface and having an intermediate surface between the first wedging surface and the lip-engaging surface, the angle between the intermediate surface and the lip-engaging surface being greater than the angle of the first wedging surface relative to the lip-engaging surface and including the steps of: cutting a solid ring from a pipe or tube of predetermined diameter, the diameter of the pipe or tube being larger than the outer diameter of the spigot end of the pipe; cutting out a small section of the ring to leave a gap between two ends at a split; rolling the gapped ring such that the ends move towards each other to reduce the gap and set the ring to have an inner diameter just larger than the outer diameter of a spigot end of the pipe; and forcing the ends of the ring apart to create a specified permanent set in the ring such that the ring is operative as a bearing ring and is compressible around the spigot end pipe with the inner diameter of the bearing ring intimately around the outer diameter of the spigot end of the pipe.

The method further comprises the steps of: placing the bearing ring around the spigot end of a pipe and behind an outwardly projecting portion, and proceeding with the steps outlined in the first sentence of the immediately above paragraph. The bearing ring is compressed around the spigot end by the use of a tool prior to the sliding step and removal of the tool allows the seating of the bearing ring within the retaining groove.

BRIEF DESCRIPTION OF THE DRAWINGS

These and other features of the present invention and the attendant advantages will be readily apparent to those of ordinary skill in the art and the invention will be more easily understood from the following detailed description of the preferred embodiments of the present invention taken in conjunction with the accompanying drawings wherein like characters represent like parts throughout the several views and in which:

FIGS. 4A and 5A show perspective views of different snap rings useful in the FIG. 3A embodiment of the present invention, whereas

FIG. 7 shows a set screw spigot ring according to the present invention.

FIG. 8 shows a heat-shrunk spigot ring according to the present invention.

FIG. 9 shows a perspective view of a bearing ring having discontinuous segments of wedging surfaces according to the present invention.

DETAILED DESCRIPTION OF THE PREFERRED EMBODIMENTS

Figure 1:
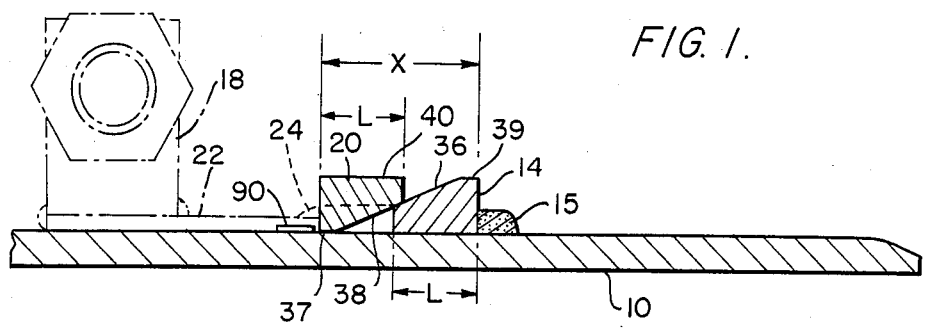
FIG. 1 shows a side view in cross section of parts of a pipe joint according to a first embodiment of the present invention.
Figure 2:
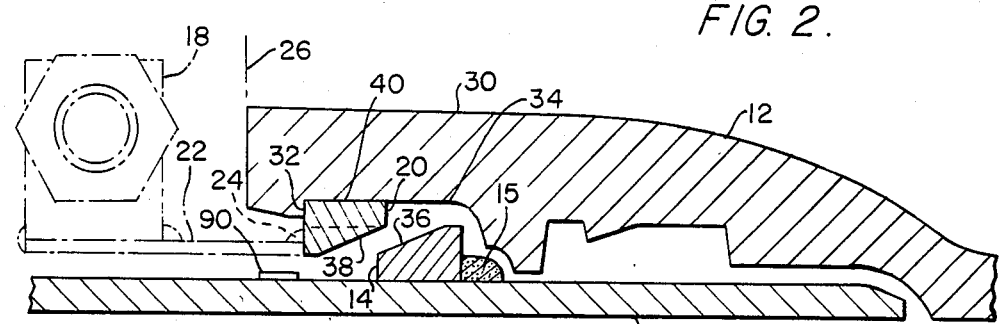
FIG. 2 shows a cross sectional view of the FIG. 1 embodiment in assembled form.
Figure 3A:
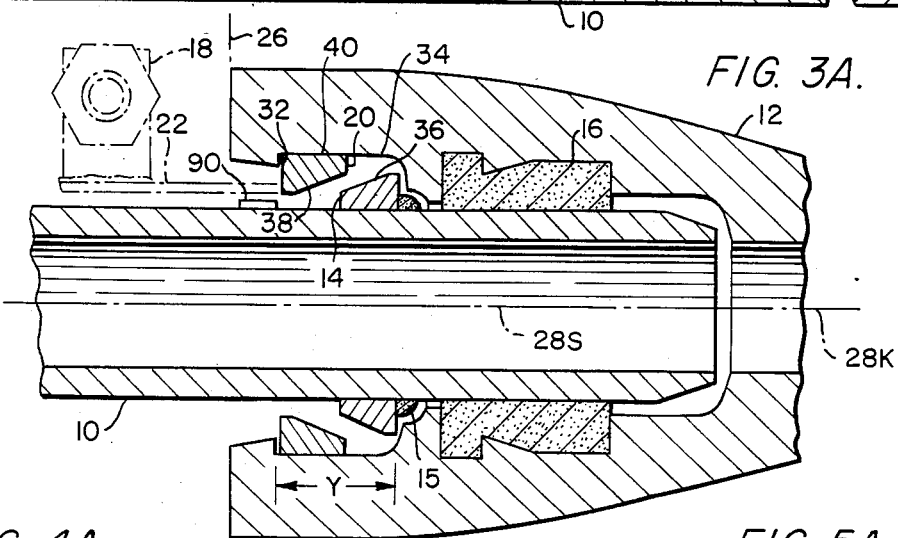
FIG. 3A shows a full cross sectional view of the pipe joint of FIG. 2 in assembled form.

Turning now to FIGS. 1, 2, and 3A, a first embodiment of the present invention will be described. A pipe joint restrained against axial separation is formed upon insertion of a spigot end 10 of a pipe into a socket end 12 of a joining pipe, the restraining action being accomplished through snap ring member 20, while gasket 16 seals the joint. The spigot end 10 of a pipe includes a spigot ring 14 welded to the pipe by a welding bead 15. Most importantly, the spigot ring 14, which serves as an outwardly projecting portion on the spigot 10, is tapered and includes wedging surface 36. That is, the spigot ring 14 is thicker at its right side (as viewed in FIGS. 1, 2 and 3A) than at its left side.

As best shown in FIGS. 2 and 3A, a snap ring 20 presses outwardly against an annular retaining groove 34 in a retaining portion 30 of the socket 12. A lip 32 is disposed at the left side of the annular retaining groove 34.

The bearing or snap ring 20 may include struts 22 secured by welding bead 24 and a ring adjustor 18 in a fashion similar to the arrangement described in more detail in the aforenoted U.S. Pat. No. 4,428,604. A gasket 16 (FIG. 3A only) is used to seal the joint. Most importantly, and unlike the bearing ring in that patent, the bearing ring 20 according to the present invention is tapered in complimentary fashion to the taper of the spigot ring 14. Specifically, the bearing ring 20 includes a second wedging surface 38 to mate with the wedging surface 36.

Since the operation of the present invention is similar in some respects to that of the U.S. Pat. No. 4,428,604, the assembly and operation of the embodiment of FIGS. 1, 2, and 3A will now be discussed with emphasis being placed on the differences between the present invention and the invention of that patent.

Figure 4A:
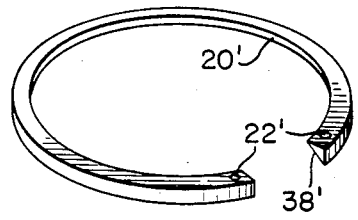
Figure 5A:
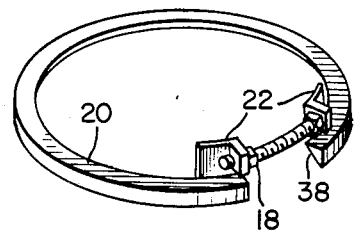

Initially, assembly of the present invention is started by tightening the bearing ring 20 to the position shown in FIG. 1. The bearing ring 20 may be tightened to this position by a ring adjustor 18 in a fashion described in detail in the aforenoted U.S. Pat. No. 4,428,604. This would correspond to the snap ring 20 of FIG. 5A. However, the ring adjustor 18 is not necessary and the snap ring may be configured as 20' as shown in FIG. 4A. Instead of struts 22 and a ring adjustor 18, the bearing ring 20' includes holes 22' which allow a tool (not shown) to draw the split ends of the snap ring 20' together thereby compressing the snap ring 20' around the spigot 10. The tool could simply be a pair of channel lock or water pump pliers with two ¼" drill rods welded at a right angle to the plane of the pliers and as close as possible to the end of the jaws.

The snap ring 20' is simpler and more economical to manufacture than the snap ring 20 with ring adjustor 18. Other techniques for expanding and contracting the bearing ring could be used.

Once the spigot 10 and bearing ring 20 are assembled to the position of FIG. 1, the socket end 12 of a second pipe may be pushed onto the end 10 to obtain the position shown in FIG. 2 and FIG. 3A. Various surfaces could be lubricated including the inside surface of the gasket 16 (shown in FIG. 3A only), these steps being well understood in the art. The spigot ring 14 is now within the end plane 26 at the end of the socket 12. Accordingly, the ring adjustor 18 can now be adjusted and allowed to expand the diameter of the bearing or snap ring 20 until it pushes outwardly against the annular retaining groove 34 as shown in FIG. 3A. Alternately, if the snap ring 20' of FIG. 4A was used, the tool which held the holes 22' close together would be removed such that the snap ring or bearing ring 20' would expand to its natural diameter and into the position shown in FIG. 3A. Accordingly, the snap ring 20 (or 20') would be trapped between the lip 32 at the edge of the retaining groove 34 and the spigot ring 14.

As shown in FIG. 3A, the retaining groove 34 may have an effective width Y only slightly larger than the width X of FIG. 1. The effective width would be the axial distance from lip 32 to that point at the right side of groove 34 which hits spigot ring 14 when the socket pipe 12 is pushed straight towards spigot end pipe 10. Because of the tapered wedging surfaces 36 and 38, the width Y of the groove 34 may be less than the sum of the bearing ring width L and the spigot ring width also L. As shown, part of the bearing ring 40 is always radially outside of spigot ring 14 such that the bearing ring 20 and spigot ring 14 together occupy less axial width (X) than the sum of their individual axial width (2L). The feature allows reduction in the size of groove 34 and lessens the amount of material (and corresponding cost) needed to make the socket. This feature also prevents the bearing or snap ring 20 from binding to spigot pipe 10 because wedging surface 38 will necessarily contact wedging surface 36 when pipe 12 is angularly deflected relative to pipe 10 before any such binding occurs. As shown in FIGS. 1, 2, and 3A, the ring 20 uniquely defines a plane of width L in which it is disposed.

The wedging surfaces 36 and 38 allow a great amount of angular deflection between the axis 28S of the spigot 10 and the axis 28K of the socket pipe 12 without concentrating great amounts of stress over a small area. Specifically, as the axis 28K is angularly displaced relative to axis 28S, a portion of the wedging surface 36 of spigot ring 14 will bear against a portion of the wedging surface 38 on bearing ring 20. The tapered wedging surfaces 36 and 38 will together cause the bearing or snap ring 20 to spread and wedge outward, thereby distributing stress more evenly around the socket 12 and spigot 10 than was the case for prior art structures such as that disclosed in U.S. Pat. No. 4,428,604. Because stress is distributed so well, the manufacturing tolerance need not be as great as would otherwise be required. When great force on the wedging surfaces 36 and 38 creates slight distortion of a flexible pipe spigot 10, this movement or distortion results in even better (i.e., more even) distribution of stress in the pipe joint.

An angular deflection between axis 28S of spigot 10 and axis 28K of socket 12 or a force tending to separate the spigot 10 from the socket 12 will cause the wedging surfaces 36 and 38 to come into contact. This in turn results in a radially outward force applied to the bearing ring 20 and a radially inward force applied to the spigot 10 (by way of spigot ring 14). These forces tend to maintain full surface contact between the radially outer surface 40 of bearing ring 20 and the radially inner surface of the annular groove 34.

The slope of the bearing ring wedging surface 38 should be in the range of 15°–30° with respect to the pipe axis 28S when axes 28S and 28K are colinear. The angle is 60° to 75° relative to lip-engaging surface 35. The spigot ring wedging surface 36 should have the same angle with respect to axis 28S. The angles of 22° to 24°, specifically 23°, work quite well. Wedging surface angles larger than 30° can seriously limit achievable deflection and increase stress concentrations in the deflected position. Wedging surfaces with angles less than 15° can cause problems in ring engagement considering normal manufacturing tolerance and worst fit cases. Also, the use of angles smaller than 15° may cause increased normal loads on the spigot which may not be tolerated. Such normal loads may cause excessive compressive stress on the spigot ring.

Figure 11:
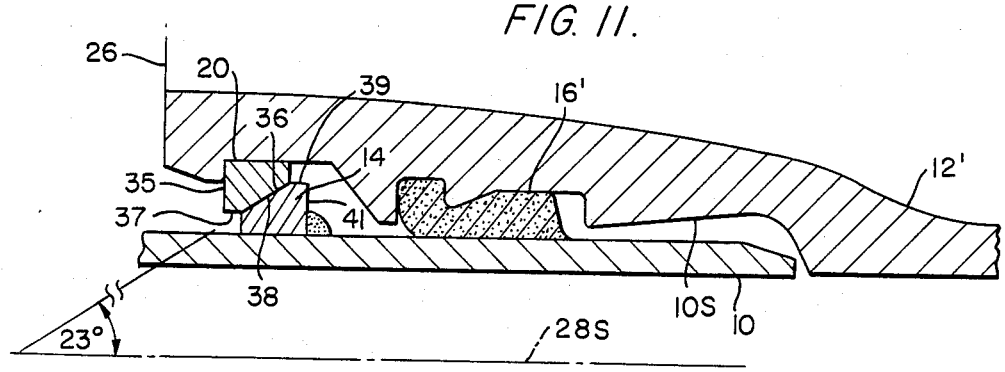
FIG. 11 shows a side cross-section view illustrative of certain features of the present pipe joint.

Continuing to consider FIGS. 1, 2 and 3A, but also considering FIG. 11, a feature which makes the rings easier to produce with desirable thickness tolerances will be discussed. As shown in FIG. 11, the bearing ring 20 includes an intermediate surface 37 in between the wedging surface 38 and its lip engaging surface 35. The intermediate surface 37 is flat and, when the socket end pipe 12' is axially in line with the spigot end pipe 10, the intermediate surface 37 is parallel (in cross-section) to the pipe axis 28S. Likewise, the spigot ring 14 includes an intermediate surface 39 in between its wedging surface 36 and a back surface 41. The intermediate surface 39 is flat and parallel (in cross-section) to the pipe axis 28S. Surfaces 35 and 41 are perpendicular to the pipe axis 28S except that surface 35 may deviate somewhat from being perpendicular to axis 28S if pipe 12' is angularly deflected relative to pipe 10.

The importance of the intermediate surfaces 37 and 39 is to avoid the pointed or sharp edged interfaces which would otherwise occur between the wedging surfaces 36 and 38 with their respective corresponding surfaces 41 and 35. The avoidance of an acute angle or sharp edge is quite useful in maintaining or controlling thickness tolerances. If the angle of one of the wedging surfaces 36 or 38 is slightly off, an acute angle may cause a significant variation in the thickness of the bearing ring 20 or spigot ring 14. The inclusion of the intermediate surfaces avoids this problem because the angle between the intermediate surfaces and the corresponding surfaces (either 35 or 41) is, for example, less than the angle of the wedging surface 38 relative to the lip engaging surface 35. In other words, all acute angles are avoided with subsequent greater manufacturing control over the thickness of the rings 20 and 14. If the manufacturing tolerances were not properly controlled, one might easily develop a situation where the socket end pipe 12 or 12' could not be placed over the bearing ring 20.

All of the embodiments of the present invention as shown in the various drawings will include intermediate surfaces such as 37 and 39 to avoid the acute angles as discussed. However, for ease of illustration, these surfaces have not been numbered on the drawings other than FIGS. 1, 3B and 11.

FIG. 11 further shows a feature of the present invention whereby a slightly different shaped socket 12' and standard gasket 16' may be used. A useful feature of the socket end pipe 12' is that it includes a stop surface 10S which is tapered radially inward towards the end plane 26. The stop surface 10S is operable to prevent the pipe 10 from angularly deflecting beyond a certain point relative to the socket end pipe 12'. Although the ability to accommodate some deflection of the spigot relative to the socket is desirable and an object of the present pipe joint, the stop surface 10S will in effect "bind up" on the inside of the socket on one side of the joint. This will increase the beam strength of the joint and lessen the likelyhood of overdeflection. As shown in FIG. 11, if the spigot end pipe 10 is tilted counterclockwise such that its right end is lifted, it will bind against the stop surface 10S of the socket end pipe 12'. The tapered stop surface 10S would, of course, be annular and extend completely around the inside of the socket end pipe 12'.

FIG. 11 also shows that the preferred angle for wedging surfaces 36 and 38 is 23°.

Figure 3B:
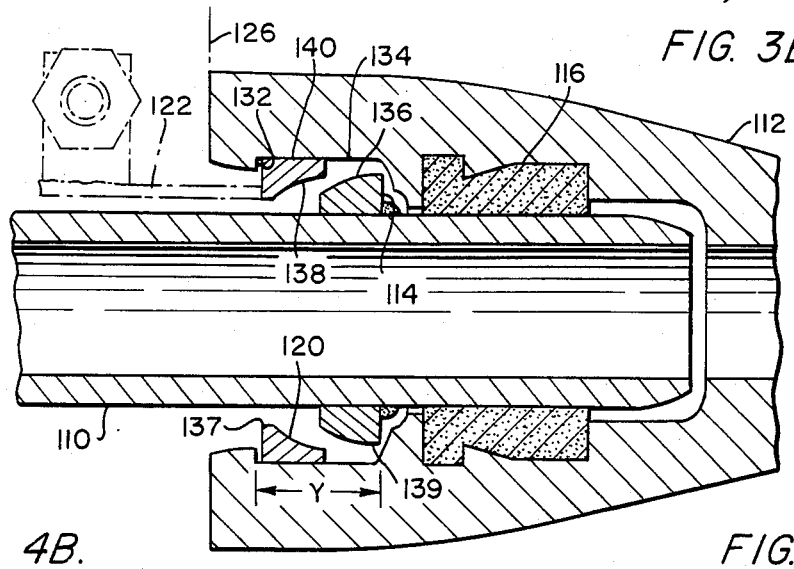
FIG. 3B shows a full cross sectional view of a second pipe joint embodiment of the present invention.
Figures 4B, 5B:
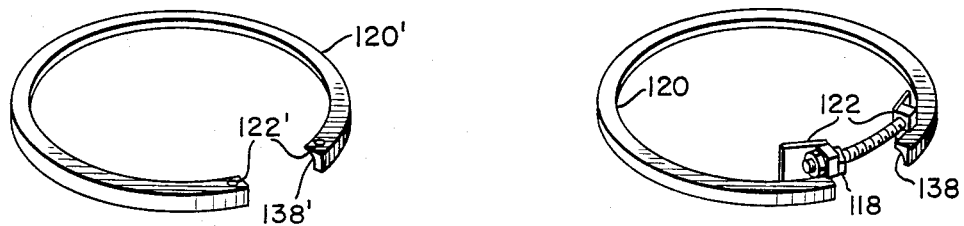
FIGS. 4B and 5B show bearing rings useful in the FIG. 3B embodiment of the present invention.

Turning now to FIGS. 3B, 4B, and 5B, a second embodiment of a pipe joint shown in cross section in FIG. 3B is quite similar to that shown in FIG. 3A. Likewise, the bearing rings of FIGS. 4B and 5B are respectively similar to those FIGS. 4A and 5A. Accordingly, the numerals for FIGS. 3B, 4B, and 5B are in the 100 series with the same last two digits as the corresponding part as labeled in FIGS. 3A, 4A, or 5A.

Concentrating on the differences between the embodiment of FIG. 3B and that of the FIG. 3A, it will be noted that the wedging surface 136 of spigot ring 114 is an annular convex curve in the cross sectional view of FIG. 3B instead of a straight line similar to wedging surface 36 in FIG. 3A. The wedging surface 138 is an annular concave curve in the cross section view of FIG. 3B as opposed to the straight line taper shown for surface 38 in FIG. 3A. The wedging surfaces 138 and 136 preferably have an angle of from 15° to 30° relative to the axis of pipe 110, these angles for the curved surfaces 138 and 136 being defined by the tangent at the axial midpoint of surfaces 138 and 136. Intermediate surfaces 137 and 139 serve the same purposes to surfaces 37 and 39 discussed above.

The embodiment of FIG. 3B may use a bearing ring 120 as shown in FIG. 5B or, alternately, may use a bearing ring 120' as shown in FIG. 4B. These bearing rings are identical in structure to the corresponding bearing rings 20 and 20' except for the concave curve on their wedging surfaces.

The assembly and operation of the embodiment of FIG. 3B is essentially identical to that of the embodiment of FIG. 3A. The curved tapered surfaces 136 and 138 help to minimize the width Y (FIG. 3B) of the retaining groove 134 since the snap ring 120 may be tightened over the spigot ring 114 in similar fashion to the position shown in FIG. 1 for bearing ring 20 and spigot ring 14. Additionally, the curved wedging surfaces 136 and 138 tend to minimize stress concentrations and evenly distribute stess in the same essential fashion as the straight line tapered surfaces 36 and 38 of the first embodiment.

Figure 6:
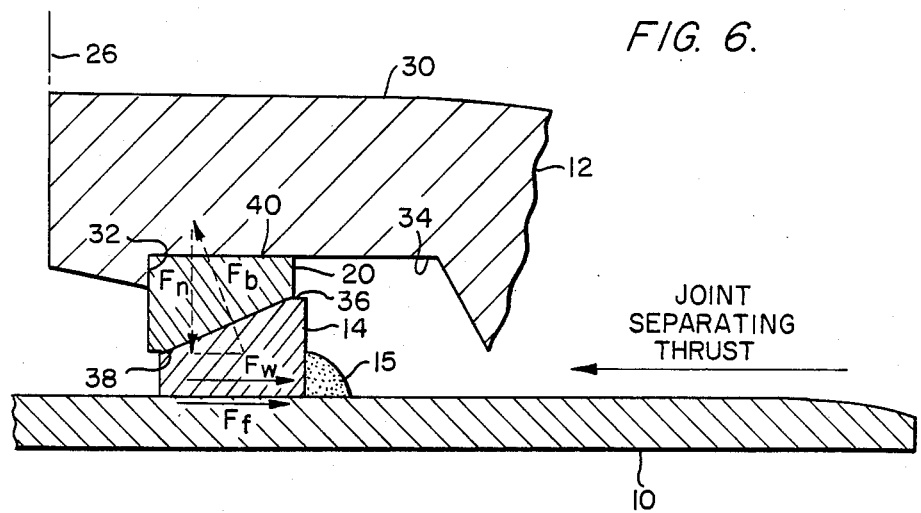
FIG. 6 shows an enlarged view of parts of the FIG. 3A pipe joint and illustrates the forces acting on the pipe joint and illustrating a welded spigot ring according to the present invention.

Turning now to FIG. 6, a highly advantageous feature of the present invention will be discussed in detail. FIG. 6 shows a cross sectional view of the spigot 10 and socket 12 when subjected to a joint separating thrust. In the simplified sketch of forces shown in FIG. 6, the variables represent:

$F_f$ = force of friction on the outside of spigot 10 (an equal and oppositely directed force is on the inside of spigot ring 14)

m = coefficient of friction between the spigot 10 and spigot ring 14

$F_w$ = shearing force on weld bead 15

$F_b$ = wedging force between the wedging surfaces 36 and 38

$F_n$ = component of wedging force normal to the surface of spigot 10.

The friction force $F_f = mF_n$, as is readily known in the art. In order to be stable, $F_w + F_f$ must be equal to the thrust applied to the spigot 10 of the pipe joint. Now, if the thrust is increased, one or both of the forces $F_w$ and $F_f$ must increase to avoid the separation of the socket 12 from spigot 10. Since the increased thrust or axial separation force increases the wedging force $F_b$, it increases the normal component $F_n$. This in turn ($F_f = mF_n$), and most importantly, increases $F_f$ which lessons the necessary increase in $F_w$. Since $F_w$ tends to shear the welding bead 15, it is highly advantageous to obtain an increase in $F_f$ as the thrust increases. Although $F_w$ may still increase with increasing thrust, the increase is not as great as it would be without the action of wedging surfaces 36 and 38.

The operation of the wedging surfaces 36 and 38 (or 136 and 138) allows the welding bead 15 to withstand much greater joint separating thrusts then would otherwise be the case. Further, the size and cost of a spigot weld can be significantly reduced for a given amount of thrust resisting capability. That is, the weld bead 15 may be constructed smaller in size because the frictional resistance may carry a significant portion of the joint separating thrust.

Turning now to FIG. 7, an alternate embodiment pipe joint will be discussed. FIG. 7 shows a cross section view with parts labeled in the 200 series and having the same last two digits as the corresponding parts in the embodiment of FIG. 3A.

The embodiment of FIG. 7 is the same as the embodiment of FIG. 3A except that the spigot ring 214 is secured to the spigot 210 without the use of welding. Instead, a number of set screws 242 (only one is visable in FIG. 7) are circumferentially spaced on the spigot ring 214. The wedging surfaces 236 and 238 function in the same manner as the corresponding wedging surfaces 36 and 38 in FIG. 3A. The set screws 242 are preferably multiple safety head set screws with cupped points.

In FIG. 7, an increase in the thrust T results in a disproportionate increase in the normal force $F_n$ in the same fashion as with the FIG. 6 force diagram. The increase in normal force $F_n$ in turn results in similar increases in $F_f$, which is the total frictional resistance between spigot 210 and set screw 242 and spigot ring 214. Further, $F_s$, which is the pipe wall shearing resistance to set screw 242, is increased as the set screw 242 penetrates further into the spigot 210. Accordingly, an increase in thrust causes an increase in the joints resistance to separation of the pipe joint which allows the use of fewer and/or smaller size set screws than would otherwise be necessary.

The possibility of the set screws 242 damaging the structural integrity of spigot 10 is minimized since the set screws can not penetrate the spigot further than they protrude from the spigot ring 214. The spigot ring 214 acts as a friction collar once the set screws have initiated the wedging action, thereby more evenly distributing stress around the spigot pipe.

Turning now to FIG. 8, a third method of attaching the spigot ring to the spigot will be discussed. The parts of the pipe joint shown in cross section in FIG. 8 are labled in the 300 series with the same last two digits as the corresponding part of the FIG. 3A embodiment. The pipe joint of FIG. 8 is the same as the FIG. 3A embodiment except that the spigot ring 314 is secured to the spigot 310 by heat-shrinking the ring around the spigot 310. Specifically, the ring 314 is expanded by heating and then slid over the spigot 310 such that it contracts to tightly grip spigot 310 as it cools. The ring 314 may preferrably also be equipped with intermittent gripping portions 344 on its internal surface. The intermittent gripping portions 344 function in a similar manner to the set screws 242 of FIG. 7. The wedging surfaces 336 and 338 function in the same fashion as the wedging surfaces 36 and 38 in FIG. 3A.

After the spigot ring 314 has shrunk into place around spigot 310 and the joint assembled as shown in FIG. 8, an increase in the joint separating thrust T will also cause an increase in the frictional resistance $F_f$ and the pipe wall shearing resistance $F_s$ in the same fashion as with the FIG. 7 embodiment. Once again, the wedging surfaces increase the resistance to failure of the pipe joint.

It will readily be appreciated that the set screw attachment method of FIG. 7 and heat-shrinking method of FIG. 8 may also be used in combination with curved wedging surfaces such as 136 and 138 in FIG. 3B. Additionally, either the curved or straight tapered wedging surfaces may be constructed in a segmented arrangement as shown for bearing ring 420 in FIG. 9. The snap or bearing ring 420 is constructed with segments 446 having wedging surfaces 438 spaced in between gaps 448. The reduction of the metal cross section of the snap ring 420 at intervals as shown in FIG. 9 may not significantly affect the flexural performance and strength of the joint. This structure may be desirable for small diameter pipes to increase the flexibility and resilience of the snap ring.

Figure 10:
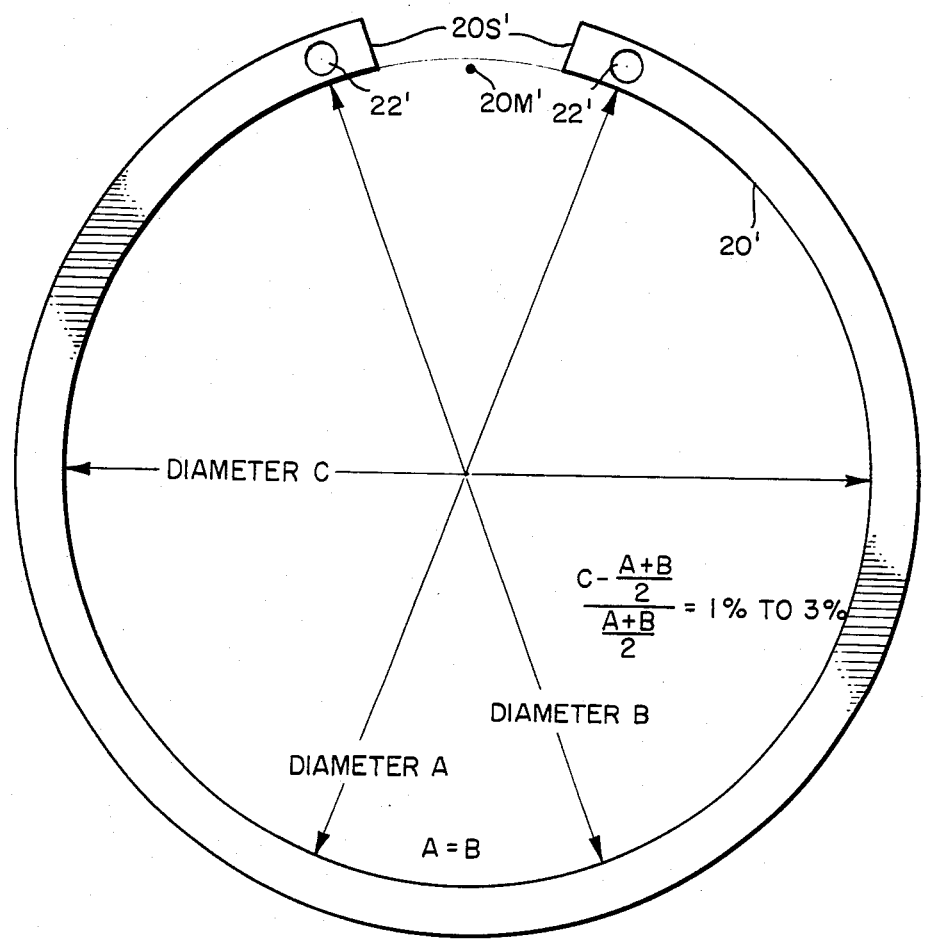
FIG. 10 shows a planar view of a snap ring or bearing ring according to the present invention.

Turning now to FIG. 10, an important feature of the snap ring or bearing ring of the present invention will be discussed in detail. In particular, FIG. 10 shows a planar view of the snap ring 20' including holes 22'. As indicated on the figure, the snap ring 20' includes a major diameter C which is 90° (or at least 85° to 95°) removed from a midpoint 20M' between the split ends 20S'. Further, the bearing ring 20' includes minor diameters A and B disposed at each of the holes 22'. As indicated on the figure, the diameter C is larger than the average of diameters A and B by a range of one to three percent. The diameters A and B are equal within manufacturing tolerances, this average being used to calculate the difference with diameter C only to compensate for such manufacturing tolerances. Of course, a true minor diameter for the split ring 20' would extend from a midpoint 20M'. Although the ring 20' is out of round as indicated, its radial thickness is the same throughout.

Continuing to view FIG. 10, but also considering FIGS. 1, 2 and 3A, the importance of this out of round feature of snap ring 20' (or bearing rings 20, 120, or 120' which are likewise out of round). This special shape of the snap ring 20' is used to accommodate the very slight clearance between the socket lip 32 and the snap ring 20' and the outside surface of the pipe spigot 10. The relative inflexibility of large section, small diameter snap rings and the effects of normally expected manufacturing tolerances on the ring joint fit and ring engagement might otherwise cause problems. For example, if the inside diameter of the socket lip 32 and the retaining groove 34 was large, the radial thickness of the bearing ring 20' was small, and the outside diameter of the pipe spigot and/or spigot ring 14 was small, (small and large meaning relative to their manufacturing tolerance ranges), the lack of substantial diametrical interference of the bearing ring 20 and spigot ring 14 in the assembled joint could result in a reduction in load carrying capacity of the restrained joint. Additionally, this might allow the joint to easily over deflect resulting in leakage or other failure. For these reasons, it is desirable to use the indicated bearing ring shape which can be intimately compressed or caulked around or against the spigot to pass through a "tight" annular opening between the pipe spigot 10 and the socket restraining lip 32. At the same time, this system will serve satisfactorily when allowed to expand outwardly into the retaining groove 34. The need for this particular ring shape will be further explained below with respect to the assembly of the present pipe joint.

The manufacturing procedure preferred to produce the properly shaped bearing ring 20' (or 20, 120, or 120' shaped likewise) includes the following steps:

(1) A solid ring is cut from a pipe or tube of predetermined diameter, the diameter of which is larger than the size of spigot end pipe 10 for which the ring is to be used with. Cutting by lathe is most acceptable.

(2) A small section of ring is then cut out and removed so as to leave a gap between two split ends of the ring.

(3) The ring is then rolled down so that the ends of the ring are closed toward each other and the gap is reduced by a specified permanent set in the ring. This step is commonly called "cold rolling" and relies upon three rollers arranged in triangular fashion. Specifically, the ring is placed in between all three of the rollers and at least one of the rollers is movable and is moved to press into the ring, thereby compressing the ring. At least one of the rollers is a driving roller and turns to cause the ring to rotate, this rolling process reducing the diameter of the ring approximately uniformly to just greater than the outside diameter of the pipe 10. Thus, the ring will now fit almost perfectly around the spigot pipe 10 with the reduced gap.

(4) The ends of the ring are then forced apart as by use of a tool to spread the holes 22'. The ends of the ring are maintained apart sufficiently long to create a specified permanent gap between the ring ends. The ring no longer has a uniform inner diameter just larger than the outer diameter of the spigot end pipe 10. Instead, it has the non-uniform or out of round shape as indicated in FIG. 10.

(5) The ring is then closed down on a representative pipe to check the fit. If the above steps were carried out properly, the ring may be closed down around a pipe such as spigot end pipe 10 and will be substantially intimately in contact with the spigot end pipe 10. That is, step 3 above will have made the ring perfectly fitted for this intimate contact, whereas step 4 above will have changed the ring shape sufficiently to allow it to be slid onto a pipe 10. However, this perfect fit of step 3 will be resumed when a tool or other means is used to fit the ring 20' around a pipe 10.

The spigot ring 14 may be produced per steps 1–3 as outlined above, but would not require steps 4–5 to assure proper performance in the joint.

Of course, both the bearing ring and the spigot ring could be produced by other manufacturing processes, such as casting, with shapes modeled from those produced by rolling operations 1–5 as shown above.

Method of Assembly

The significance of the intermediate surfaces such as 37 and 39 and the special ring shape as discussed above, will be more fully appreciated after considering the detailed methods of assembly of the present pipe joint. The steps for assembly of the present pipe joint are as follows:

(1) The bearing ring 20 is placed onto the pipe 10 behind the welded spigot ring as shown in FIG. 1. This may be done by spreading the bearing ring ends by hand or with the specially adapted pliers having drill rods to fit within the drill holes 22'. The bearing ring 20 should, of course, be oriented correctly by having its thickest side away from the taper or end of the spigot end pipe 10.

(2) The retaining groove 34 and gasket recess (in which gasket 16 is disposed in FIG. 3) should be cleaned by removing any mud, gravel or other foreign matter. The gasket 16 should be installed within its recess in accordance with known procedures and the joint components should be lubricated.

(3) The snap ring 20 is compressed to the position shown in FIG. 1 in intimate contact (i.e., no significant gaps) around pipe 10. This may be accomplished by the optional ring adjustor 18, the pliers discussed above, or other techniques. Note that in this position the wedging surface 38 is in contact with the wedging surface 36.

(4) With the pipe in essentially straight alignment, the socket end pipe 12 is disposed around the spigot end pipe 10. Preferably, this is done by sliding spigot end pipe 10 within socket end pipe 12 until the spigot strip 90 (shown in FIGS. 2 and 3A only) is covered. Alternately, socket pipe 12 should be disposed around spigot pipe 10 by sliding socket pipe 12 around spigot pipe 10 while spigot pipe 10 is stationary or also being slid. The spigot strip 90 is simply a painted or otherwise marked annular strip which extends around the pipe 10. The snap ring 20 may now be allowed to expand by simply removing the pliers or other tool which has constrained it in intimate contact with the pipe 10. Alternately, if the optional ring adjustor 18 is used, this may simply be adjusted to allow the snap ring 20 to expand. The correct seating of the snap ring or bearing ring 20 in the annular retaining groove 34 should be apparent as an obvious spreading of the ring ends occurs. If inspection reveals that the ring 20 is not completely seated in the socket locking groove 34, it may be properly positioned by caulking or tapping it with a tapered handle or other flat caulking instrument. It may also be necessary to move the entering pipe slightly to improve alignment if the ring 20 does not readily spring into the locking or retaining groove 34. When caulking is employed to properly position the ring 20, correct seating is generally assured by an audible snapping noise as the ring 20 springs into position seated within groove 34.

(5) Once the bearing ring is correctly secured in the retaining groove 34, the joint may then be deflected within the range of the rated maximum deflection as desired by simply moving the adjoining pipes. If disassembly of the joint is required, it may be accomplished using the pliers to compress the bearing ring 20 (or using the optional ring adjustor 18) and generally reversing the procedures outlines above. If axial movement has occured in the joint prior to disassembly, it may be necessary to move the spigot pipe deeper within the socket in straight alignment to allow the ring 20 to be compressed onto the spigot 10 for removal.

An additional or alternate method of assembling the present pipe joint is quite similar to the procedure outlined above. Specifically, when the ring 20 is placed behind the spigot ring 14, it may be placed behind (i.e., further from the spigot end) the spigot indication strip 90. The socket end pipe 12 is then brought around the spigot 10 and the spigot ring 14 until the spigot strip 90 disappears within the bell or socket end of pipe 10. However, the bearing ring 20 is not within the socket end pipe 12. The bearing ring 20 may be readily assembled without any special ring compressing tool by simply caulking (i.e., tapping with a tool) the bearing ring into the socket beginning with one end of the ring 20 and progressing around the joint until the entire ring 20 is inside of the socket end pipe 12. This method of assembly is made easier by holding the free end of the bearing ring 20 against the pipe as the other end is caulked inside the socket.

When a visual inspection is not practical to determine if the bearing ring 20 is properly seated, a feeler gauge (measuring the distance between the ring split ends) may simply be used to ensure correct positioning.

As used throughout this description, the pipe 10 has been referred to as a spigot end pipe or spigot, whereas the pipe 12 has been referred to as a socket end pipe. It will of course be readily appreciated that a socket or bell end would be included at the end of pipe 10 opposite from the illustrated end. Likewise, a spigot would be used at the end of pipe 12 opposite the illustrated end.

Although specific constructions have been discussed herein, it is to be understood that they are for illustrative purposes only. Various modifications and adaptations of the present invention will be readily apparent to those of ordinary skill in the art. Accordingly, the scope of the present invention should be determined by reference to the claims appended hereto.

What is claimed is:

1. A pipe joint restrained against axial separation comprising:
   (a) a first pipe having a cylindrical socket;
   (b) a second pipe having a cylindrical spigot extending into said cylindrical socket and having an axis; 1
   (c) a sealing gasket between said cylindrical spigot and said cylindrical socket;
   (d) a bearing ring retaining portion on one of said first and second pipes defining an end plane and having a retaining groove bounded by a lip;
   (e) a bearing ring having two ends at a split, said bearing ring being positioned between said retaining portion and the other of said first and second pipes and having a first wedging surface tapered radially inward towards said end plane, a lip-engaging surface, and an intermediate surface between said lip-engaging surface and said first wedging surface, the angle between said intermediate surface and said lip-engaging surface being greater than the angle of said first wedging surface relative to said lip-engaging surface, said bearing ring in its unconstrained state having a major diameter and a minor diameter less than said major diameter; and
   (f) an outwardly projecting portion on said other of said first and second pipes and disposed within said retaining portion and having a second wedging surface tapered radially inward towards said end plane at an angle from 15° to 30° relative to said axis; and
   wherein said first wedging surface and said second wedging surface together cause said bearing ring to push radially out against said retaining groove when said pipe joint is subject to a joint separating force, and wherein said minor diameter is at one of said split ends and said major diameter is 85° to 95° from a midpoint between said split ends.

2. The pipe joint of claim 1 wherein said first wedging surface has an angle from 15° to 30° relative to said axis.

3. The pipe joint of claim 1 wherein said outwardly projecting portion is radially within said retaining groove and wherein said retaining groove insures that at least part of said bearing ring is always radially outside and axially overlapping said outwardly projecting portion such that said bearing ring and said outwardly projected portion together occupy less axial width than the sum of their individual axial widths.

4. The pipe joint of claim 3 wherein said retaining portion is part of said socket, said outwardly projecting portion is fixed to said spigot and within said socket, and said bearing ring bears between said retaining portion of said socket and said outwardly projecting portion.

5. The pipe joint of claim 1 wherein said major diameter is from 1% to 3% greater than the average of diameters at said split ends.

6. The pipe joint of claim 4 further comprising a ring adjustor mounted to said bearing ring and outside of said end plane.

7. The pipe joint of claim 1 wherein said intermediate surface has a flat cross-section which is parallel to said axis when said first and second pipes are axially aligned.

8. The pipe joint of claim 1 wherein said socket includes a stop surface tapered radially inward towards said end plane and operable to prevent overdeflection of said spigot relative to said socket.

9. A pipe joint restrained against axial separation comprising:
   (a) a first pipe having a cylindrical socket;
   (b) a second pipe having a cylindrical spigot extending into said cylindrical socket and having an axis;
   (c) a bearing ring retaining portion on said socket defining an end plane and having a retaining groove bounded by a lip;
   (d) a bearing ring having two ends at a split and positioned between said retaining portion and said cylindrical spigot, said bearing ring in its unconstrained state having a major diameter and a minor diameter less than said major diameter; and; spigot (e) an outwardly projecting portion on said and disposed within said retaining portion; and wherein one of said diameters is disposed at least at one of said split ends, and wherein said bearing ring locks said spigot against separation from said socket, and wherein said minor diameter is at one of said split ends and said major diameter is 85° to 95° from a midpoint said split ends.

10. The pipe joint of claim 9 wherein said major diameter is from 1% to 3% greater than the average diameters at said split ends.

11. The pipe joint of claim 9 wherein said bearing ring is operable such that tightening it around said spigot will insure intimate contact around said spigot.

12. The pipe joint of claim 9 wherein said bearing ring has a first wedging surface tapered radially inward towards said end plane, a lip-engaging surface, and an intermediate surface between said lip-engaging surface and said first wedging surface, the angle between said intermediate and said lip-engaging surface being greater than the angle of said first wedging surface relative to said lip-engaging surface, and wherein said outwardly projecting portion includes a second wedging surface tapered radially inward towards said end plane.

13. The pipe joint of claim 12 wherein said second wedging surface is at an angle from 15° to 30° relative to said axis, and said first wedging surface is at an angle from 60° to 75° relative to said lip-engaging surface.

14. The pipe joint of claim 12 wherein said bearing ring is operable such that tightening it around said spigot will insure intimate contact around said spigot.

15. The pipe joint of claim 9 wherein said socket includes a stop surface operable to engage a portion of said spigot to prevent overdeflection of said spigot relative to said socket, and further comprising a gasket, and wherein said stop surface extends radially inward and is disposed axially between said gasket and an end of said spigot.

16. The pipe joint of claim 9 wherein said outwardly projecting portion is fixed to said spigot.

* * * * *